3,297,610
COATING AND LAMINATING COMPOSITIONS CONSISTING OF A BLEND OF PARAFFIN, ISOPARAFFIN AND MICROCRYSTALLINE WAXES WITH ETHYLENE-VINYL ACETATE COPOLYMER
Hallard C. Moyer, Homewood, Ill., assignor to Sinclair Research, Inc., New York, N.Y., a corporation of Delaware
No Drawing. Filed June 24, 1963, Ser. No. 290,152
9 Claims. (Cl. 260—28.5)

This invention relates to novel wax compositions which are especially useful as coatings. The new formulations find utility for coating cellulosic or other films and the compositions are characterized by good heat sealability and blocking resistance. More particularly, the invention concerns compositions which can be coated on cellulosic or other films to produce a sheet which readily forms a good bond when heat sealed to a variety of films, especially polypropylene film or other flexible wrapping sheet material.

Large quantities of petroleum waxes are consumed in coating or impregnating paper or other materials for various packaging uses. In one such use, a printed paper label is waxed in such fashion that a wax film is retained on both surfaces of the sheet. This label is used, together with a transparent film material, to wrap bread loaves. The waxed label or "bread band" encircles the central region of the loaf under the transparent wrapper which encloses the entire loaf. Closure of the package is obtained (except for the ends) by heat sealing the transparent film and band as a lap seam along the bottom of the loaf, two plies of transparent film and two plies of waxed band being involved in this lap seam.

In order to have a secure closure along the overlapping seams it is normally necessary to obtain a strong heat sealed bond between the waxed band and the transparent film. This situation imposes rather severe performance requirements on the wax. Any of several diverse types of transparent film may be used, and each such film may exhibit different adhesion characteristics and present a different sealing problem with respect to wax performance. However, it is highly desirable that the wax coating readily form a strong bond between the paper band and the transparent film, regardless of the type of transparent film used. This problem is further compounded because performance should be acceptable on any of the variously designed commercial wrapping machines.

Of the several types of flexible transparent film used for wrapping, polypropylene, in particular, has presented a difficult wax sealing problem. Wax compositions affording good heat sealability to polypropylene heretofore have been of such a soft or sticky nature that the waxed paper band when wound in rolls, fuses or "blocks" to itself and cannot be unwound without damage and costly operating delays. Schemes employed in attempting to overcome this blocking difficulty include use of a blocking-resistant wax composition at the expense of good sealability, or incorporating an anti-blocking agent such as stearamide or oleamide in the wax, or applying a very thin film of a silicone oil on the wax surface. Use of such an anti-blocking agent may eliminate or reduce blocking tendency, but it also, in many cases, causes a rapid deterioration of seal strength on aging so that, while a freshly formed seal may appear aceptable in strength, after aging overnight the seal loses all or most of its strength.

A wax composition has now been discovered which affords good bond strength when heat sealing plies of flexible wrapping sheet materials, e.g., paper to polypropylene or other films, yet the formulation affords such surprisingly good blocking resistance that coatings involving this wax composition will not block or stick under conditions of temperature and pressure normally encountered in commercial use. Strong seals can also be formed readily with other frequently used transparent films such as nitrocellulose-coated cellophane, polyvinylidene chloride-coated cellophane, polyethylene and other flexible wrapping materials, especially synthetic resin sheets. Furthermore, no specific anti-blocking agent need be included in this composition, and there is little, if any, progressive loss of seal strength on aging. Good seals can be formed to polypropylene or other films over a very wide range of sealing temperatures, times, pressures, and cooling conditions, so that the composition has the added advantage of performing well on packaging equipment of various designs. Still another advantage of the composition is its relatively low viscosity which permits paper or other film to be waxed at high speeds on conventional waxing equipment. Yet another advantage of this composition is the absence of any volatile solvent which, if present, would require special precautions for removal of vapors.

The composition of my invention is obtained by blending together a particular combination of waxes and ethylene-vinyl acetate copolymer in the proper proportions. The amount of copolymer used is about 1–15% of the composition, and the proportion of wax is about 85%–99%.

The wax blend is composed of four petroleum waxes in the designated approximate amounts as follows:

| Component | Wt., Percent | Preferred Wt., Percent |
|---|---|---|
| Hard, paraffinic wax | 40–55 | 45–55 |
| Isoparaffinic wax | 10–25 | 10–20 |
| Very soft microcrystalline wax | 10–30 | 15–25 |
| Moderately soft microcrystalline wax | 5–20 | 10–20 |

Also, the blend is composed of about 50 to 75% total of the hard, paraffinic wax and isoparaffinic wax, and about 30 to 50% total of the microcrystalline waxes.

The hard, paraffinic wax has a melting point (M.P.) (ASTM D87) of about 137–15° F. and is essential for obtaining the desired blocking resistance. If the prescribed amount is exceeded to any extent or if the melting point is materially above the indicated range, poor seal strength can result. If lesser amounts are used or if the melting point is lowered, blocking resistance of the finished product will not be adequate. An outstanding feature of this wax blend lies in the discovery that the high blocking characteristics of the hard, paraffinic wax are substantially maintained in spite of the presence in the formulation of a roughly equal amount of soft, low-blocking, relatively stick waxes. The hard, paraffinic wax has these approximate properties: 1.4285–1.4320 refractive index at 80° C. (R.I.), 7–11 needle penetration at 77° F. (N.P.) (ASTMD 1321), and 39–42 viscosity (SSU/210° F.).

The isopraffinic petroleum wax is a soft wax and can be derived from relatively high boiling lube distillates from mixed base crude oil. This component is especially characterized by a melting point of about 112 to 122° F. (ASTMD 87) and has these approximate properties: 1.4390–1.4420 refractive index at 80° C., 50–75 needle penetration at 77° F. (ASTM D1321), 44–50 viscosity (SSU/210° F.).

The very soft microcrystalline wax can be obtained by solvent fractionation operations on the residual lube portion of a mixed base crude oil. Aside from a congealing point (ASTM D938) of about 110 to 135° F., the wax is characterized by these approximate properties: 1.4500–1.4540 refractive index at 80° C., 80–100 viscosity (SSU/

210° F.) and 60–140 needle penetration at 77° F. (ASTM D1321).

The moderately soft microcrystalline wax can also be produced by solvent fractionation operations on the residual lube portion of a mixed base crude oil. This micro-wax has a congealing point (Cong. Pt.) (ASTM D938) of about 150 to 165° F., and is characterized by these approximate properties: 1.4470–1.4510 refractive index at 80° C., 75–90 viscosity (SSU/210° F.) and 15–27 needle peneration at 77° F. (ASTM D1321). Each of these wax components is known but they have not, to my knowledge, been combined as in the present invention to produce a wax base having the novel performance properties now exhibited, i.e., capable (on being combined with a minor amount of the proper polymeric ingredient) of forming a blocking resistant coating having good seal strength, even on polypropylene film.

The wax base has adequate sealing properties for the intended use but, by itself, is too sticky, especially under sustained pressure, to perform satisfactorily. A well-known method of hardening wax consists of adding a relatively tough, hard polymer, for example, various types of polyethylene have been used for such purposes. However, in the case of my wax blend it has been found that polyethylene, while hardening the base waxes, may actually magnify blocking tendencies. Furthermore, various types of polyethylene tested were found to destroy the heat sealing qualities essential to this product. Contrary to these results I found that a copolymer of ethylene and vinyl acetate in a particular ratio, gives the desired freedom from pressure tack, but does not unduly impair sealing performance. This general type of copolymer is described in U.S. Patent 2,877,196 to Reding; however, in my invention it is necessary that the polymerized vinyl acetate content of the copolymer be no more than about 30 weight percent, otherwise the copolymer is not sufficiently compatible with the wax. Also, is was found that ethylene-vinyl acetate copolymers of about 18% or less vinyl acetate content are not suitable because of seal strength impairment tendencies. Accordingly, the vinyl acetate-derived content of the copolymer is about 20–30%, and minor amounts of other non-deleterious monomer components might be in the polymer.

The molecular weight of the copolymer, as indicated by "melt index," can vary over a rather wide range and the copolymer may have a melt index of about 1 to 500. If a relatively high molecular weight material (about 25 or lower melt index) is employed, the preferred amount of copolymer for use with the wax base is about 1–10%. If a lower molecular weight material (e.g., about 25–500 melt index) is employed, the preferred amount is about 5–15%. If more than about 15% copolymer is used, several disadvantages can occur such as: viscosity increase, cost increase, sealing temperature and pressure become more critical, and seal strength is not improved to compensate for these undesirable consequences.

My compositions can, if desired, contain minor amounts of other ingredients. For instance, it is normally advantageous to include an appropriate amount of an oxidation inhibitor. Also, if desired, as much as about 2% of low (2,000–20,000) molecular weight polyethylene can be included in the composition without seriously impairing seal strength.

The blocking performance of the compositions of this invention was ascertained by testing wax paper specimens by (a) the gradient blocking test as described in TAPPI T652 ts–61, (b) the Sinclair pressure blocking test in which specimens are subjected to a uniform pressure of, e.g., 100 p.s.i.g. in addition to a temperature gradient, and (c) evaluating any general tendency for stickiness or tackiness of stacks of waxed sheets.

Sealing performance was evaluated by sealing together two plies of waxed paper and two plies of polypropylene or other transparent film, stacked alternately to form a film-paper-film-paper 4-ply specimen with film as the bottom ply. The four plies were sealed together by laying the stack across a flat, metal bar 1½ inches wide, electrically heated to sealing temperature, and surmounting the specimen with a cushioned block exerting a pressure of 1.7 gm./sq. in. The specimen was then similarly cooled against a cold bar, or allowed to air cool. Thus, three seals were formed between the four plies, as in the packaging of bread. Each of these seals was evaluated, with the strength of the middle seal being of principal importance as this corresponds to the seal actually forming the closure on the loaf of bread. The compositions of this invention are especially effective at forming a strong middle seal in conjunction with polypropylene film.

Examples of the composition of this invention are given below but are not to be considered limiting. The compositions were made by blending the components at about 300° F.

EXAMPLE 1

|  | Wt. Percent | Wt. Percent |
|---|---|---|
| 143° F. M.P. hard paraffin wax, R.I. 1.4305, N.P. 9, Vis. 40.3 | 48 | |
| 119° F. M.P. isoparaffinic wax, R.I. 1.4411, N.P. 61, Vis. 48.5 | 20 | 90 |
| 125° F. Cong. Pt. microcrystalline wax, R.I. 1.4515, N.P. 80, Vis. 80 (impure) | 20 | |
| 160° F. Cong. Pt. microcrystalline wax, R.I. 1.4481, N.P. 20, Vis. 85 | 12 | |
| Copolymer of ethylene and vinyl acetate, 125 melt index, 28% vinyl acetate | | 10 |
| Butylated hydroxytoluene (BHT) oxidation inhibitor | | (¹) |

¹ .005 p.p.m.

EXAMPLE 2

|  | Wt. Percent | Wt. Percent |
|---|---|---|
| 138° F. M.P. hard paraffin wax, R.I. 1.4295, N.P. 9, Vis. 39.3 | 50 | |
| 119° F. M.P. isoparaffinic wax, R.I. 1.4411, N.P. 61, Vis. 48.5 | 15 | 95 |
| 120° F. Cong. Pt. microcyrstalline wax, R.I. 1.4521, N.P. 110, Vis. 85 | 25 | |
| 155° F. Cong. Pt. microcrystalline wax, R.I. 1.4483, N.P. 26, Vis. 78.8 | 10 | |
| Copolymer of ethylene and vinyl acetate, 20 melt index, 28% vinyl acetate | | 5 |
| BHT oxidation inhibitor | | (¹) |

¹ .005 p.p.m.

EXAMPLE 3

|  | Wt. Percent | Wt. Percent |
|---|---|---|
| 143° F. M.P. hard paraffin wax, R.I. 1.4313, N.P. 8, Vis. 40.9 | 50 | |
| 114° F. M.P. isoparaffinic wax, R.I. 1.4396, N.P. 60, Vis. 46.2 | 20 | 98 |
| 120° F. Cong. Pt. microcrystalline wax, R.I. 1.4521, N.P. 110, Vis. 85 | 15 | |
| 155° F. Cong. Pt. microcrystalline wax, R.I. 1.4483, N.P. 26, Vis. 78.8 | 15 | |
| Copolymer of ethylene and vinyl acetate, 15 melt index, 28% vinyl acetate | | 2 |
| BHT oxidation inhibitor | | (¹) |

¹ .005 p.p.m.

When the compositions of Examples 1 to 3 were tested for blocking performance, the gradient blocking temperature (ASTM 1465–57T) was found to be 108° F. or over, with practically no "picking" or partial blocking at lower temperatures. When blocking temperature was measured with specimens being subjected to 100 p.s.i.g., a very unusual phenomenon was observed—the blocking temperature actually increased. The blocking temperature of these formulations, under pressure, loses sharpness and becomes broad and indefinite, but in general the blocking temperature was observed to be about 5–15° F. higher when the specimens were under pressure. This is contrary to the normal situation with waxes as observed in hundreds of previous cases in which the effect of pressure varies from substantially no effect to a reduction of the blocking point to room temperature. Very soft, low blocking components as in my compositions, usually cause a large reduction in pressure blocking point, which makes the behavior of the compositions of this invention all the more unusual.

The sealing performance of the compositions of Examples 1 to 3 was good when tested as described above. This was true for polypropylene film, as well as for other films. It should be emphasized that, while the use of ethylene-vinyl acetate copolymers as a component for adhesives and sealable waxes is well known, minor amounts of this copolymer in various waxes do not normally provide a satisfactory product for the purposes of this invention. Thus my results were obtained only upon using the defined wax blend and copolymer in the designated amounts.

It is claimed:

1. A wax composition suitable as a coating and bonding material consisting essentially of about 85–99% of a wax blend and about 1 to 15% of an ethylene-vinyl acetate copolymer having a polymerized vinyl acetate content of about 20–30% and a melt index of about 1 to 500, said wax blend consisting essentially of about 40 to 55% paraffinic petroleum wax having a melting point of about 137–145° F., a refractive index at 80° C. of about 1.4285 to 1.4320, a needle penetration at 77° F. of about 7 to 11, and a viscosity of about 39 to 42 SSU at 210° F.; about 10 to 25% of an isoparaffinic petroleum wax having a melting point of about 112–122° F., a refractive index at 80° C. of about 1.4390 to 1.4420, a needle penetration at 77° F. of about 50 to 75, and a viscosity of about 44 to 50 SSU at 210° F.; about 10 to 30% of a microcrystalline petroleum wax having a congealing point of about 110–135° F., a refractive index at 80° C. of about 1.4500 to 1.4540, a needle penetration at 77° F. of about 60 to 140, and a viscosity of about 80 to 100 SSU at 210° F.; and about 5 to about 20% of a microcrystalline petroleum wax having a congealing point of about 150–165° F., a refractive index at 80° C. of about 1.4470 to 1.4510, a needle penetration at 77° F. of about 15 to 27 and a viscosity of about 75 to 90 SSU at 210° F.; said wax blend consisting essentially of about 50 to 70% of said paraffinic petroleum wax and said isoparaffinic petroleum wax, and about 30 to 50% of said microcrystalline waxes.

2. The composition of claim 1 wherein the amounts of the components of the wax blend are 45–55% of said paraffinic petroleum wax, 10–20% of said isoparaffinic petroleum wax and 15–25% of said microcrystalline petroleum wax having a congealing point of about 110–135° F. and 10–20% of said microcrystalline wax having a congealing point of about 150–165° F.

3. A flexible wrapping sheet material coated with the composition of claim 1.

4. A cellulosic, flexible wrapping sheet material coated with the composition of claim 1.

5. The coated sheet of claim 4 wherein the amounts of the components in the wax blend are 45–55% of said paraffinic wax, 10–20% of said isoparaffinic petroleum wax, 15–25% of said microcrystalline petroleum wax having a congealing point of 110–135° F. and 10–20% of said microcrystalline wax having a congealing point of about 150–165° F.

6. An article of manufacture consisting essentially of a flexible transparent wrapping sheet material and a flexible, cellulosic wrapping sheet material, said sheet materials having a heat sealed bond therebetween, the composition of claim 1.

7. The article of manufacture of claim 6 wherein the transparent material is polypropylene film.

8. The article of manufacture of claim 7 wherein the cellulosic sheet is wax-coated paper.

9. The article of manufacture of claim 8 wherein the amounts of the components in said wax blend are 45–55% of said paraffinic petroleum wax, 10–20% of said isoparaffinic petroleum wax, 15–25% of said microcrystalline petroleum wax having a congealing point of 110–135° F. and 10–20% of said microcrystalline wax having a congealing point of about 150–165° F.

References Cited by the Examiner

UNITED STATES PATENTS

| | | | |
|---|---|---|---|
| 3,025,167 | 3/1962 | Butler | 260—28.5 |
| 3,048,551 | 8/1962 | Lutz | 260—28.5 |
| 3,048,553 | 8/1962 | Moss | 260—28.5 |

MORRIS LIEBMAN, *Primary Examner.*

D. C. KOLASCH, J. A. GAZEWOOD,
*Asisstant Examiners.*